United States Patent Office 2,948,734
Patented Aug. 9, 1960

2,948,734

ESTERIFICATION OF PYRIDINE CARBOXYLIC ACIDS

Irwin W. Sangrelet, Waukegan, Ill., assignor to Abbott Laboratories, North Chicago, Ill., a corporation of Illinois No Drawing. Filed Nov. 5, 1956, Ser. No. 620,208

5 Claims. (Cl. 260—295.5)

This invention relates generally to a process for the preparation of esters of pyridine carboxylic acids and more particularly to an improved process for the preparation of esters of nicotinic acid utilizing alkane sulfonic acids as a catalyst.

Esters of nicotinic acid are important as intermediates in the production of nicotinamide which latter product is of particular usefulness for many pharmaceutical preparations. Such esters have been prepared by the combination of nicotinic acid and an alcohol in the presence of excess sulfuric acid, however, such a process involves many steps and is expensive because of the large amounts of unrecoverable sulfuric acid involved. Smaller amounts of sulfuric acid may be employed in an esterification comprising the use of smaller chain alcohols but generally the yield of ester product is affected adversely by reducing the amount of sulfuric acid catalyst in the esterification.

It is an object of this invention to provide a more economical process for the preparation of esters of nicotinic acids.

Another object of this invention is to provide a process for the esterification of nicotinic acid in the presence of small amounts of catalyst.

A further object of this invention is to provide a simple process for the esterification of nicotinic acid characterized by the attainment of approximately theoretical yields.

In the accomplishment of these and other objects, there is provided a process for the esterification of nicotinic acid which comprises reacting nicotinic acid with an aliphatic alcohol containing at least 4 carbon atoms in the presence of alkane sulfonic acids serving as a catalyst. The reaction is performed in the presence of an inert, water immiscible organic solvent which is capable of forming a constant boiling azeotrope with water so that as the reaction continues, the formed water is continuously removed. The water is separated out in a water separator at reduced temperature, thereafter, the alcohol and solvent is returned to the reaction area. An alcohol containing no less than 4 carbon atoms is required so that azeotropic removal of water in the water separator is assured. The alkane sulfonic acid catalysts form an acid salt with the nicotinic acid at the nitrogen position in the pyridine ring. Under such conditions, the esterification proceeds expediently and results in quantitative yields. Small amounts of the alkane sulfonic acids are sufficient because the added recoverable organic solvent assumes the greater role in azeotropic removal of water. The reaction can proceed without the presence of the organic solvent in which case the alcohol and water alone form the constant boiling azetrope but in such an arrangement much larger amounts of catalyst and alcohol are required. In the instant process the amount of catalyst employed is generally no more than 10% by weight of the nicotinic acid used in the esterification procedure.

Alkane sulfonic acids which can be used are selected from a group comprising the sulfonic acids of methyl, ethyl, propyl and the like. It is preferred to use a mixture of essentially methyl, ethyl and isopropyl sulfonic acids sold under the trade name of "Indoil." Amyl alcohol is the preferred alcohol and benzene the prefererd solvent. When amyl alcohol is employed in the reaction with nicotinic acid about 2.5 moles of alcohol is combined with each mole of nicotinic acid and generally no more than 0.1 part by weight of "Indoil" is added to each part of nicotinic acid. The reactants are refluxed until a sample shows no more nicotinic acid present during which time about the theoretical amount of water formed in the esterification process is removed. The excess amyl alcohol is removed by distillation, and then the residue is distilled to separate the amyl nicotinate.

The following examples further illustrate the principles of this invention in its selected form without, however, intending to limit the invention to the precise reactants and conditions set forth.

*Example I*

One hundred and twenty three grams of nicotinic acid is added to a flask charge with 300 cc. of commercial mixed primary amyl alcohols comprising about 85% isoamyl and 15% n-amyl alcohols. To this mixture 10 grams of "Indoil" is added and the combined reactants are refluxed through a water separator charged with benzene. The formed water is removed as an azeotrope with benzene. The water-benzene azeotrope is removed to a cooler portion of the water separator wherein the water is separated and the benzene returned to the reaction chamber. Refluxing is continued under a maximum temperature of 150° C. for about 20 hours or until a sample shows no test for free nicotinic acid.

The test for free nicotinic acid is performed by extracting a sample with dilute sodium carbonate solution. The sample is acidified with sulfuric acid and copper sulfate pentahydrate is added. The pH of the sample is brought down to a range of 3.5–4.0 with sodium hydroxide solution. Absence of substantial precipitate formation indicates that the reaction is complete and no free nicotinic acid is now present.

After the absence of nicotinic acid is shown, the mixture is cooled to 60° C. and washed with a soltuion of 29% ammonia in water to remove the catalyst. The alcohol is then refluxed through a water separator until the formed water is drawn off. The excess amyl alcohol is then removed by distillation and the amyl nicotinate residue is then separated by distillation. The yield of the amyl nicotinate ester is 180.5 grams or a 93.5% yield.

*Example II*

Ten gallons of amyl alcohol is charged into a 25 gallon glass-lined still to which is added 3 pounds of "Indoil" followed by 30 pounds of nicotinic acid. The mixture is brought to reflux through a water separator charged with benzene. Refluxing is continued for about 12 hours under a maximum temperature of about 150° C. or until a sample shows no test for free nicotinic acid. The water formed is removed as a water-benzene azetrope to a cooler portion of the water separator wherein the water is separated out. The mixture is cooled to 60° C. and washed with a solution of 2 pounds of 29% ammonia water in 2 gallons of water. The wash is discarded and the amyl alcohol is refluxed through a water separator until all the water is taken off. The excess amyl alcohol is then distilled off and the amyl nicotinate is then separated from the residue by distillation. The yield of the ester product is 44.5 pounds or 95% of theory. The boiling point is 135–45° C. (20 min.).

*Example III*

Nicotinic acid (123 grams, 1.0 mole) is added to a flask charged with 400 cc. of isoamyl alcohol (2.7 moles)

and to this mixture 10 grams of "Indoil" is added. The combined reactants are brought to reflux through a water separator charged with benzene. Refluxing is continued at a maximum temperature of 151° C. for about 12½ hours during which time 20.5 cc. of water is removed, which is slightly in excess of theory. The nicotinate product is isolated and separated by the method as presented in Example I. The yield of the ester is 178 grams which is 91.5% of theory.

*Example IV*

Nicotinic acid (123 grams, 1.0 mole) is added to a flask charged with 250 cc. of butyl alcohol (2.7 moles) and to this mixture 20 grams of "Indoil" is added. The combined reactants are brought to reflux through a water separator charged with benzene. Refluxing is continued at a maximum temperature of 134° C. for about 20 hours during which time 19 cc. of water is removed. The nicotinate product is isolated and separated by the method as presented in Example I. The yield of the ester is 164 grams or 91% of theory.

Others may readily adapt the invention for use under various conditions of service by employing one or more of the novel features disclosed or equivalents thereof. As at present advised with respect to the apparent scope of my invention, I desire to claim the following subject matter.

I claim:

1. A process for preparing esters of pyridine carboxylic acids comprising reacting at reflux conditions, a mixture of a pyridine carboxylic acid with an alkanol having 4 to 5 carbon atoms in the presence of an inert, water-immiscible organic solvent and a lower alkyl sulfonic acid catalyst, said catalyst being present from about 0.1 to about 0.2 part by weight of the pyridine carboxylic acid, continuing said refluxing for no longer than 20 hours, removing formed water in the reaction as a constant boiling water-solvent azeotrope, thereafter, distilling said solvent and unreacted alcohol from the said mixture, and recovering from the residue the ester of pyridine carboxylic acid.

2. A process for preparing esters of pyridine carboxylic acids comprising reacting at reflux conditions, a mixture of about one mole of pyridine carboxylic acid with about 3 moles of an alkanol having 4 to 5 carbon atoms in the presence of excess benzene and a lower alkyl sulfonic acid catalyst, said catalyst being present from about 0.1 to about 0.2 part by weight of the pyridine carboxylic acid, refluxing the mixture for no longer than 20 hours, removing formed water in the reaction as a constant boiling water-benzene azeotrope, thereafter, distilling said benzene and unreacted alcohol from the said mixture and recovering from the residue the ester of pyridine carboxylic acid.

3. A process for preparing esters of nicotinic acid comprising reacting a mixture of nicotinic acid with amyl alcohol in the presence of excess benzene and at least one of the lower alkyl sulfonic acids as a catalyst, said catalyst being present in about 0.1 part by weight of the nicotinic acid, heating the mixture at a maximum temperature of 150° C. for 20 hours, removing formed water in the reaction as a constant boiling water-benzene azeotrope, thereafter, distilling said benzene and unreacted alcohol from the said mixture and recovering the amyl ester of nicotinic acid.

4. A process for preparing esters of nicotinic acid comprising reacting a mixture of about 1 mole of nicotinic acid with about 3 moles of isoamyl alcohol in the presence of excess benzene and a catalyst composed of mixed methyl, ethyl and isopropyl sulfonic acids, said catalyst being present in about 0.1 part by weight of the nicotinic acid, heating the mixture at a maximum temperature of about 150° C. for about 12½ hours, removing formed water in the reaction as a constant boiling water-benzene azeotrope, thereafter, distilling said benzene and unreacted isoamyl alcohol from the said mixture and recovering the isoamyl ester of nicotinic acid.

5. A process for preparing esters of nicotinic acid comprising reacting a mixture of about 1 mole of nicotinic acid to about 3 moles of butyl alcohol in the presence of excess benzene and a catalyst composed of mixed methyl, ethyl and isopropyl sulfonic acids, said catalyst being present in about 0.2 part by weight of the nicotinic acid, heating the mixture at a maximum temperature of 134° C. for 20 hours, removing formed water in the reaction as a constant boiling benzene-water azeotrope, thereafter, distilling said benzene and unreacted butyl alcohol from the said mixture and recovering the butyl ester of nicotinic acid.

References Cited in the file of this patent

UNITED STATES PATENTS

| | | |
|---|---|---|
| 2,758,999 | Aries et al. | Aug. 14, 1956 |
| 2,816,112 | Kapp et al. | Dec. 10, 1957 |

FOREIGN PATENTS

| | | |
|---|---|---|
| 942,509 | Germany | May 3, 1956 |
| 748,706 | Great Britain | May 9, 1956 |

OTHER REFERENCES

Groggins: Unit Processes in Org. Syn., pp. 607 and 608, 4th ed., McGraw-Hill (1952).